United States Patent
Xu (10) Patent No.: US 10,367,364 B2
(45) Date of Patent: Jul. 30, 2019

(54) METHOD AND APPARATUS FOR POWERING MOBILE DEVICE

(71) Applicant: Nokia Technologies Oy, Espoo (FI)

(72) Inventor: Xuefeng Xu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 156 days.

(21) Appl. No.: 15/302,141

(22) PCT Filed: Apr. 14, 2014

(86) PCT No.: PCT/CN2014/075293
§ 371 (c)(1),
(2) Date: Oct. 5, 2016

(87) PCT Pub. No.: WO2015/157892
PCT Pub. Date: Oct. 22, 2015

(65) Prior Publication Data
US 2017/0126044 A1 May 4, 2017

(51) Int. Cl.
*H02J 7/00* (2006.01)
*G06F 1/26* (2006.01)

(52) U.S. Cl.
CPC ............ *H02J 7/0063* (2013.01); *G06F 1/263* (2013.01); *G06F 1/266* (2013.01); *H02J 7/0006* (2013.01); *H02J 7/0052* (2013.01); *H02J 7/0054* (2013.01); *H02J 2007/0062* (2013.01); *H02J 2007/0067* (2013.01)

(58) Field of Classification Search
CPC .................. H02J 7/0063; H02J 7/0052; H02J 2007/0062; H02J 2007/0067; H02J 7/0031; H02J 2007/004; H02J 2007/0037; H02J 7/0004; G06F 1/263; Y02E 60/12; H01M 10/48

USPC .................................................. 320/134, 103
See application file for complete search history.

(56) References Cited

U.S. PATENT DOCUMENTS 5,867,007 A * 2/1999 Kim .................... H01M 10/482
320/118
6,118,250 A * 9/2000 Hutchison, IV ...... H02J 7/0073
320/110
(Continued)

FOREIGN PATENT DOCUMENTS

| CN | 1645709 | 7/2005 |
|---|---|---|
| CN | 201039140 | 3/2008 |
| CN | 202143118 | 2/2012 |

OTHER PUBLICATIONS

International Search Report and Written Opinion received for corresponding Patent Cooperation Treaty Application No. PCT/CN2014/075293, dated Jan. 9, 2015, 9 pages.

*Primary Examiner* — Richard Isla
*Assistant Examiner* — Mohammed J Sharief
(74) *Attorney, Agent, or Firm* — Banner & Witcoff, Ltd.

(57) ABSTRACT

Methods and apparatuses for powering a mobile device are provided. The method comprises detecting whether an external battery is useable for powering a mobile device through an interface. The method also comprises receiving power through the interface upon detecting the external battery being useable for powering the mobile device through the interface. With the methods and apparatuses of the present disclosure, it is easy to detect the availability of the external battery, which results in an extended battery life and enhanced battery capacity.

11 Claims, 10 Drawing Sheets

(56) References Cited

U.S. PATENT DOCUMENTS

| | | | |
|---|---|---|---|
| 2011/0112782 A1* | 5/2011 | Majima | G01R 31/361 702/63 |
| 2011/0187329 A1* | 8/2011 | Majima | H01M 10/48 320/149 |
| 2011/0260694 A1* | 10/2011 | Bourilkov | H02J 7/0006 320/157 |
| 2013/0049675 A1* | 2/2013 | Minami | H02J 7/0054 320/103 |
| 2013/0076136 A1* | 3/2013 | Manor | H02J 7/0054 307/48 |

* cited by examiner

METHOD AND APPARATUS FOR POWERING MOBILE DEVICE

RELATED APPLICATION

This application was originally filed as PCT Application No. PCT/CN2014/075293 filed Apr. 14, 2014.

TECHNICAL FIELD

The non-limiting and exemplary embodiments of the present disclosure herein relate to a power supply field. In particular, the embodiments herein relate to methods and apparatuses for powering a mobile device.

BACKGROUND

A mobile device is generally provided with an internal battery which may be detachably installed into the mobile device and provide power to the mobile device for a variety of communication services. Although the internal battery is easy to carry, it does have some constraints in terms of a battery life and battery capacity. In particular, the battery life of the internal battery would not last too long when users play games or video files on the mobile devices, probably a few hours. Due to mechanical characteristic of the mobile device, it is impossible for the internal battery to possess relatively great battery capacity.

SUMMARY

It is an object of the present disclosure to address the problems outlined above, and to provide a solution to allow an external battery to power the mobile device. This object may be obtained by providing methods and apparatuses as follows.

According to an aspect of the present disclosure, there is provided a method. The method comprises detecting whether an external battery is useable for powering a mobile device through an interface. The method also comprises receiving power through the interface upon detecting the external battery being useable for powering the mobile device through the interface.

In one embodiment, the method further comprises disabling power supply from an internal battery of the mobile device upon detecting the external battery being useable for powering the mobile device through the interface.

In one embodiment, the detecting comprises detecting whether the external battery has been connected with the mobile device through the interface and a voltage provided by the external battery is within a predefined voltage scope.

In another embodiment, the detecting comprises detecting at least one of an identity and a temperature of the external battery through the interface.

In an additional embodiment, the interface is a universal serial bus interface or an audio jack.

In a further embodiment, the interface is the universal serial bus interface and the method further comprises connecting a positive battery terminal of the external battery to a voltage bus of the universal serial bus interface and connecting a negative battery terminal of the external battery to a ground of the universal serial bus interface.

In an embodiment, the method further comprises charging, when performing charging operations on the mobile device, the internal battery first and then charging the external battery after the charge to the internal battery has been completed.

In another embodiment, the external battery is cascaded with one or more external batteries through an extended interface.

According to another aspect of the disclosure, there is provided an apparatus. The apparatus comprises an interface configured to connect the apparatus with an external battery. The apparatus also comprises a detecting unit configured to detect whether the external battery is useable for powering the apparatus through the interface. The apparatus further comprises a receiving unit configured to receive power through the interface upon detecting the external battery being useable for powering the apparatus through the interface.

In one embodiment, the receiving unit is further configured to disable power supply from an internal battery of the apparatus upon detecting the external battery being usable for powering the apparatus.

In one embodiment, the detecting unit is further configured to detect whether the external battery has been connected with the apparatus through the interface and a voltage provided by the external battery is within a predefined voltage scope.

In another embodiment, the detecting unit is further configured to detect at least one of an identity and a temperature of the external battery through the interface.

In yet another embodiment, the interface is a universal serial bus interface or an audio jack.

In an additional embodiment, the interface is the universal serial bus interface and a positive battery terminal of the external battery is connected to a voltage bus of the universal serial bus interface and a negative battery terminal of the external battery is connected to a ground of the universal serial bus interface.

In a further embodiment, the apparatus further comprises a charging unit configured to charge, when performing charging operations on the apparatus, the internal battery first and then charge the external battery after the charge to the internal battery has been completed.

According to an aspect of the present disclosure, there is provided an apparatus. The apparatus comprises means for detecting whether an external battery is useable for powering a mobile device through an interface. The apparatus also comprises means for receiving power through the interface upon detecting the external battery being useable for powering the mobile device through the interface.

According to another aspect of the present disclosure, there is provided a battery, which comprises an interface for powering the apparatus outlined in the above aspects and embodiments of the present disclosure. In an embodiment, the battery further comprises an extended interface for cascading with one or more batteries.

By means of solutions discussed in the various aspects and embodiments as mentioned above, the mobile device may be powered by the external battery, which results in an extended battery life and enhanced battery capacity. Further, through a conventional interface, for example, the universal serial bus ("USB") interface or the audio jack to power the mobile device, it is easy to detect the availability of the external battery and realize the external powering without changing the mechanical structure of the mobile device. In addition, since the external battery is provided with an extended interface through which more external batteries may be cascaded, greater battery capacity could be achieved for special applications, such as playing games or watching films on the mobile device.

BRIEF DESCRIPTION OF THE DRAWINGS

Embodiments will now be described in more detail in relation to the enclosed drawings, in which.

DETAILED DESCRIPTION

The present disclosure will now be described more fully hereinafter with reference to the accompanying drawings, in which certain embodiments of the present disclosure are shown. This disclosure may, however, be embodied in many different forms and should not be construed as limited to the embodiments set forth herein; rather, these embodiments are provided by way of example so that this disclosure will be thorough and complete, and will fully convey the scope of the present disclosure to those skilled in the art. Like numbers refer to like elements throughout the specification.

Generally, all terms used in the claims are to be interpreted according to their ordinary meaning in the technical field, unless explicitly defined otherwise herein. For example, the "mobile device" may include, but is not limited to, cellular telephones, personal digital assistants (PDAs), portable computers, image capture devices such as digital cameras, gaming devices, music storage and playback appliances, Internet appliances permitting wireless Internet access and browsing, as well as portable units or terminals that may have wireless communication capabilities. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

The basic idea of the present disclosure is to provide an external battery for powering the mobile device through an interface, such as an existing USB interface or an audio jack. Further, to meet the specific application requirements, multiple external batteries may be cascaded to provide greater battery capacity and longer battery discharging time.

Figure 1:
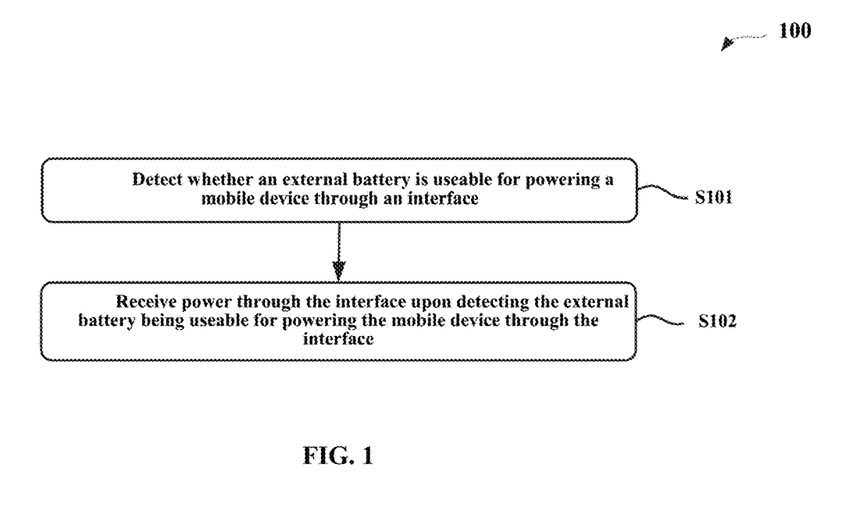
FIG. 1 is a schematic flowchart of an exemplary method for powering a mobile device according to embodiments of the present disclosure.

FIG. 1 is a schematic flowchart of a method 100 for powering a mobile device according to embodiments of the present disclosure. As illustrated in FIG. 1, at S101, the method 100 detects whether an external battery is useable for powering the mobile device through an interface. In an example embodiment, the detecting at S101 may comprise detecting whether the external battery has been connected with the mobile device through the interface and a voltage provided by the external battery is within a predefined voltage scope. For example, the scope may be between 3.4V to 4.35V (e.g., for a single Li-ion battery) and it may be doubled if two Li_ion batteries are cascaded. In another example embodiment, the detecting at S101 may comprise detecting at least one of an identity and a temperature of the external battery through the interface, as will be discussed later with reference to FIG. 3.

In the above example embodiments, the interface may be a USB interface or an audio jack. In an example embodiment, in which the interface is the USB interface, the method 100 further comprises connecting a positive battery terminal of the external battery to a voltage bus of the USB interface. The method may also comprise connecting a negative battery terminal of the external battery to a ground of the USB interface.

Returning back to the flow, at S102, the method 100 receives power through the interface upon detecting the external battery being useable for powering the mobile device through the interface. In other words, the method 100 may enable the mobile device to be powered by the external battery. The method 100 may also shut down (or switch off) an internal battery of the mobile device and turn on (or switch on) the external battery upon detecting the external battery being usable for powering the mobile device through the interface. As noted above, the detecting herein may depend on whether the voltage provided by the external battery is within the predefined voltage scope. If the voltage is too low and therefore incapable of powering the mobile device, the detecting would consider that no external battery is connected with the mobile device even if the external batter is physically connected with the mobile device.

In some example embodiments, the method 100 further charges, when performing charging operations on the mobile device, the internal battery first and then charges the external battery after the charging of the internal battery has been completed. This case may arise when low battery takes place and the user charges the mobile device using, e.g., an external power supply, such as for example a wireless or a wired charger. The charging order as proposed herein may give the internal battery a higher priority over the external battery in terms of charging.

Figure 11:
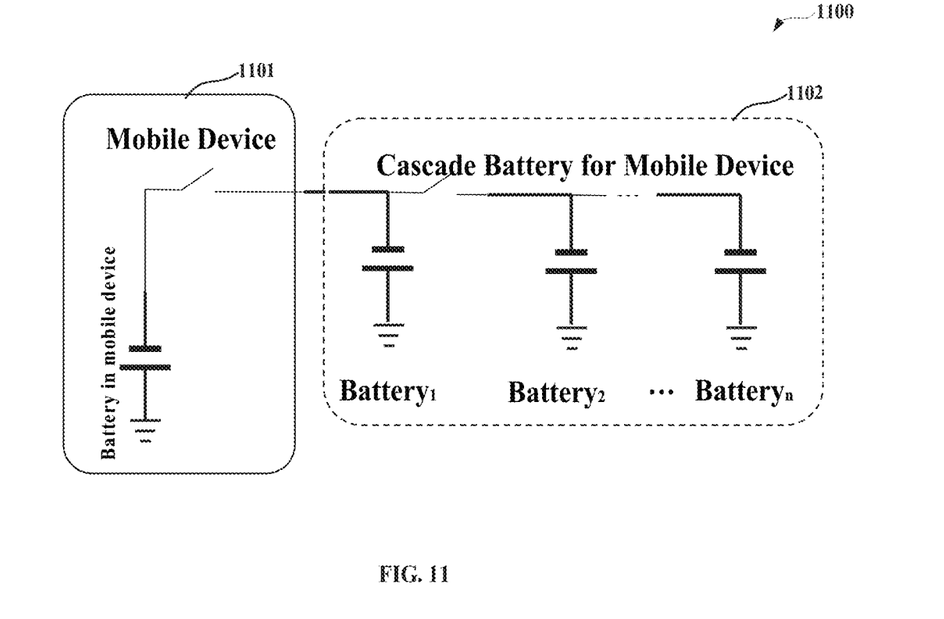
FIG. 11 is a schematic block diagram depicting an exemplary mobile device being powered by a plurality of external batteries which are cascaded with one another through respective extended interfaces.

In an example embodiment, the external battery is cascaded with one or more external batteries through an extended interface. In other words, the external battery according to the present disclosure may be provided with an extended interface which may be used to connect another external battery, which, as necessary, may also use its extended interface to connect a next external battery and so on, as shown in FIG. 11.

It should be noted that the above descriptions are only illustrative of the ideas of the present disclosure and a skilled person in the art may change and modify some technical details to meet the special application requirements. For example, although the USB interface and audio jack are exampled herein, other kinds of interface including the future developed, may also apply, mutatis mutandis, the solutions of the present disclosure. Likewise, although details with respect to the extended interface are not discussed, a person skilled in the art may understand that the extended interface may be implemented in any suitable manners as long as the number of external batteries could be cascaded through the extended interfaces and provide higher battery capacity. By means of the method 100 and its variants and extensions as discussed in the example embodiments above, it is possible to provide a longer battery discharging time and thereby users may get a better user experience.

Figure 2:
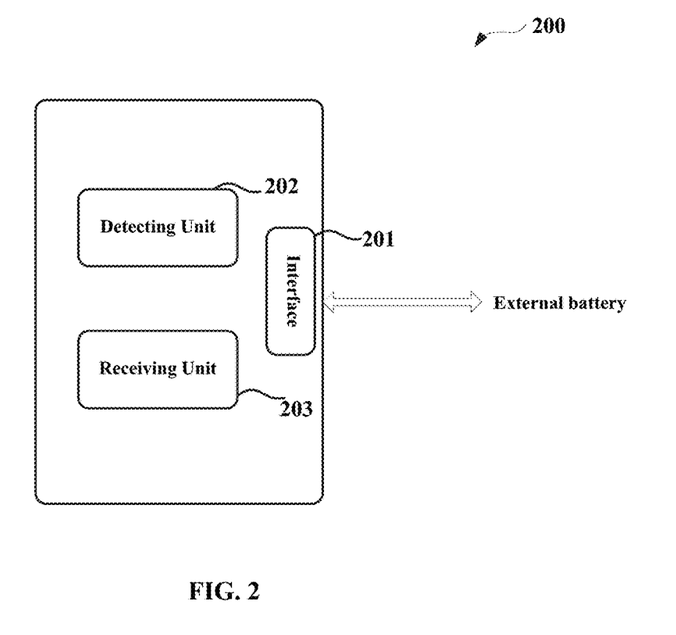
FIG. 2 is a schematic block diagram of an exemplary apparatus, which is powered by an external battery, according to an embodiment of the present disclosure.

FIG. 2 is a schematic block diagram of an apparatus 200, which is powered by an external battery (not specifically shown), according to an embodiment of the present disclosure. As illustrated in FIG. 2, the apparatus 200 comprises an interface 201 for connecting the apparatus with an external battery. As discussed with the method 100, the interface 201 herein may be a USB interface or an audio jack which may establish an electrical connection with the external battery. The apparatus 200 further comprises a detecting unit 202 configured to detect whether the external battery is useable for powering the apparatus 200 through the interface 201. The detecting unit 202 herein may be embodied on a main control unit ("MCU") as shown in FIGS. 3-10. The apparatus 200 further comprises a receiving unit 203 configured to receive power through the interface 201 upon detecting the external battery being useable for powering the apparatus 200 through the interface 201. In one example, the receiving unit 203 may shut down the internal battery of the apparatus 200 (i.e., the battery in the mobile device as depicted in FIGS. 3-10) and turn on the external battery upon detecting the external battery being usable for powering the apparatus 200. The switching operations of the shutting down and turning on may be performed by the switches, which are example implementations of the receiving unit 203, in dependence on the controlling from the MCU, such as the S1 and S2 as shown in FIGS. 3-10. In one embodiment, both the internal and external batteries are used to power the apparatus 200. The external battery may be for example coupled in parallel with the internal battery.

In an example embodiment, the detecting unit 202 is further configured to detect whether the external battery has been connected with the apparatus 200 through the interface 201 and a voltage provided by the external battery is within a predefined voltage scope. As noted before, the predefined voltage scope herein may be from 3.4-4.5V. Once the voltage is within this scope, it may be determined that the external battery and the mobile device have been electrically connected. In another example embodiment, the detecting unit 202 is further configured to detect at least one of an identity and a temperature of the external battery through the interface 201. Through the identity and the temperature, it may be determined whether the external battery is valid and its current temperature is appropriate for powering the mobile device. In this manner, it is easy to detect the availability of the mobile device.

In an example embodiment, when the USB interface is used for connecting the external battery and the apparatus 200, the positive battery terminal of the external battery is connected to a voltage bus of the USB interface and the negative battery terminal of the external battery is connected to a ground of the USB interface. In this manner, it may readily detect whether the external battery is available.

In a further example embodiment, the apparatus 200 comprises a charging unit (not shown) configured to charge, when performing charging operations on the apparatus 200, the internal battery first and then charge the external battery after the charge to the internal battery has been completed. Although not illustrated in FIG. 2, the external battery may be arranged in a cascaded manner in which more than one external battery could be serially electrically connected to provide great battery capacity.

It is to be understood that the apparatus 200 as discussed herein and depicted in FIG. 2 is only for an illustrative purpose. A person skilled in the art may understand that the apparatus 200 may also comprise other units or components for communication and mobile applications. For example, the apparatus 200 may also include one or more of the transmitters and receivers for bidirectional communication. Further, the apparatus 200 may include a display unit and an imaging unit for display and image capturing. Therefore, the apparatus 200 according to the present disclosure may be embodied as a mobile device or a part thereof, which may be powered by an external battery through the interface 201.

Figure 3:
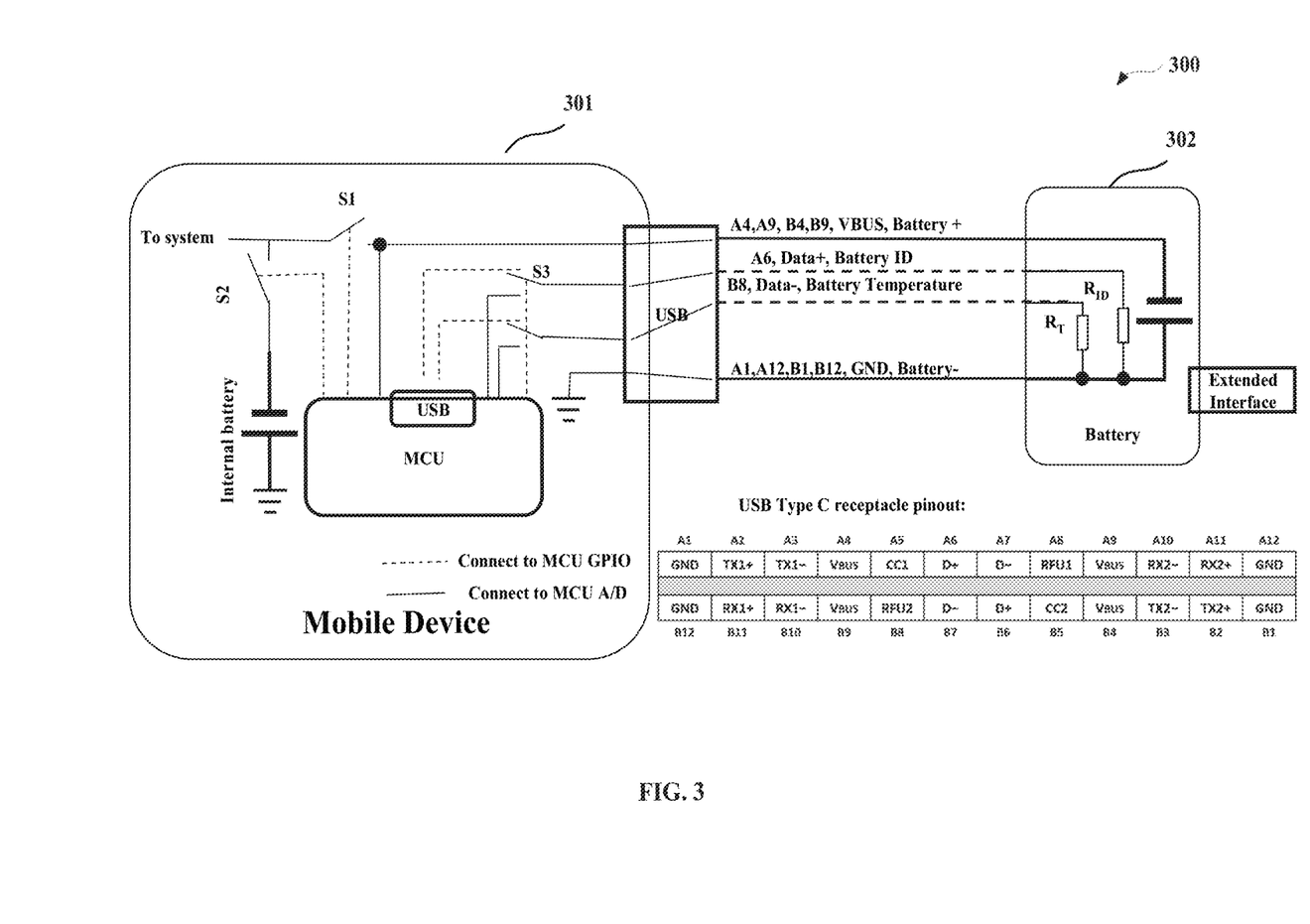
FIG. 3 is a schematic block diagram depicting an exemplary mobile device, which is powered by an external battery through a USB interface (e.g., USB type C) according to an embodiment of the present disclosure.

FIG. 3 is a schematic block diagram 300 depicting a mobile device 301, which is powered by an external battery 302 through a USB interface (e.g., USB type C as shown) according to an embodiment of the present disclosure. It should be noted that the mobile device 301 is just a technical implementation of the apparatus 200 with more technical details. For an easy discussion, the USB type C receptacle pinout is also listed at the lower right of FIG. 3.

When the external battery 302 is connected or inserted to the mobile device 301, the positive battery terminal of the external battery 302 is connected to a voltage bus ("VBUS," e.g., A4, A9, B4, B9 as listed in the USB type C receptacle pinout) of the USB interface and the negative battery terminal of the external battery is connected to a ground ("GND," e.g., A1, A12, B1, B12 as listed in the USB type C receptacle pinout) of the USB interface. Then, the MCU in the mobile device 301 may detect the insertion of the external battery 302 through a configuration channel ("CC,") pins, for example, A5/B5 as listed in the USB type C receptacle pinout shown at the lower right of FIG. 3. In the case of the USB type C, the mobile device 301 and the external battery 302 may enter into a docking mode according to USB type C specification.

In one embodiment, power is supplied from the external battery without entering the docking mode of the USB Type-C standard. The battery identity ("ID") resistor and/or the temperature resistor may be connected to any pin other than the VBUS and GND pins of the USB Type C connector depicted in FIG. 3. For example, external battery 302 may supply power via VBUS and connect the battery ID resistor and/or the battery temperature resistor to D+ and D− pins A6/B6 and A7/B7 or the TX2− and TX2+ pins B3/B3, respectively. If the mobile device 301 is configured to operate according to the USB Type-C standard, it may not accept power reception at VBUS A4, A9, B4, B9 if it does not detect a current flow at one of the configuration channel pins A5 or B5. This may enable safe co-operation with external battery 302 and mobile devices that do not support the example embodiments of the present disclosure. When the mobile device 301 detects a particular battery ID resistor in one of the pins of the USB Type C interface, it may allow power to be received via the VBUS even if it does not detect a current at one of the CC pins to indicate connection to a compatible USB Type C device.

Dependent on the configurations of the external battery 302, the MCU may optionally detect a valid battery ID ("$R_{ID}$") via a predefined pin (e.g., A6 relying on plug polarity) and start monitoring a battery temperature ("$R_T$") via a predefined pin (e.g., B8 relying on plug polarity). The detecting and monitoring herein may be performed by switching the switch "S3" from a USB connection directed to the MCU General Purpose Input/Output (GPIO) to a connection directed to the MCU analog to digital (A/D) interface. For example, as illustrated in FIG. 3, when the MCU controls to pull down the switch S3 upon detecting the external battery being inserted into the USB interface, the signal regarding the battery identity and the battery temperature would be transmitted to the MCU A/D interface through the switch S3, as depicted in two solid lines. Otherwise, the switch "S3" may be pulled up when the USB device except for the external battery has been connected with the mobile device.

Upon detecting the external battery 302 is available for discharging or powering the mobile device 301, the MCU may turn the switch "S1" on and turn the switch "S2" off through the MCU GPIO such that the external battery 302 is capable of powering the system and the internal battery stops working. In contrast, over time, when the MCU detects that the external battery or the external batteries cascaded via the respective extended interfaces (shown in FIG. 11) may not be able to provide a sufficient voltage, it may turn the switch "S1" off and turn the switch "S2" on such that the internal battery may provide power for the mobile device 301.

Figure 4:
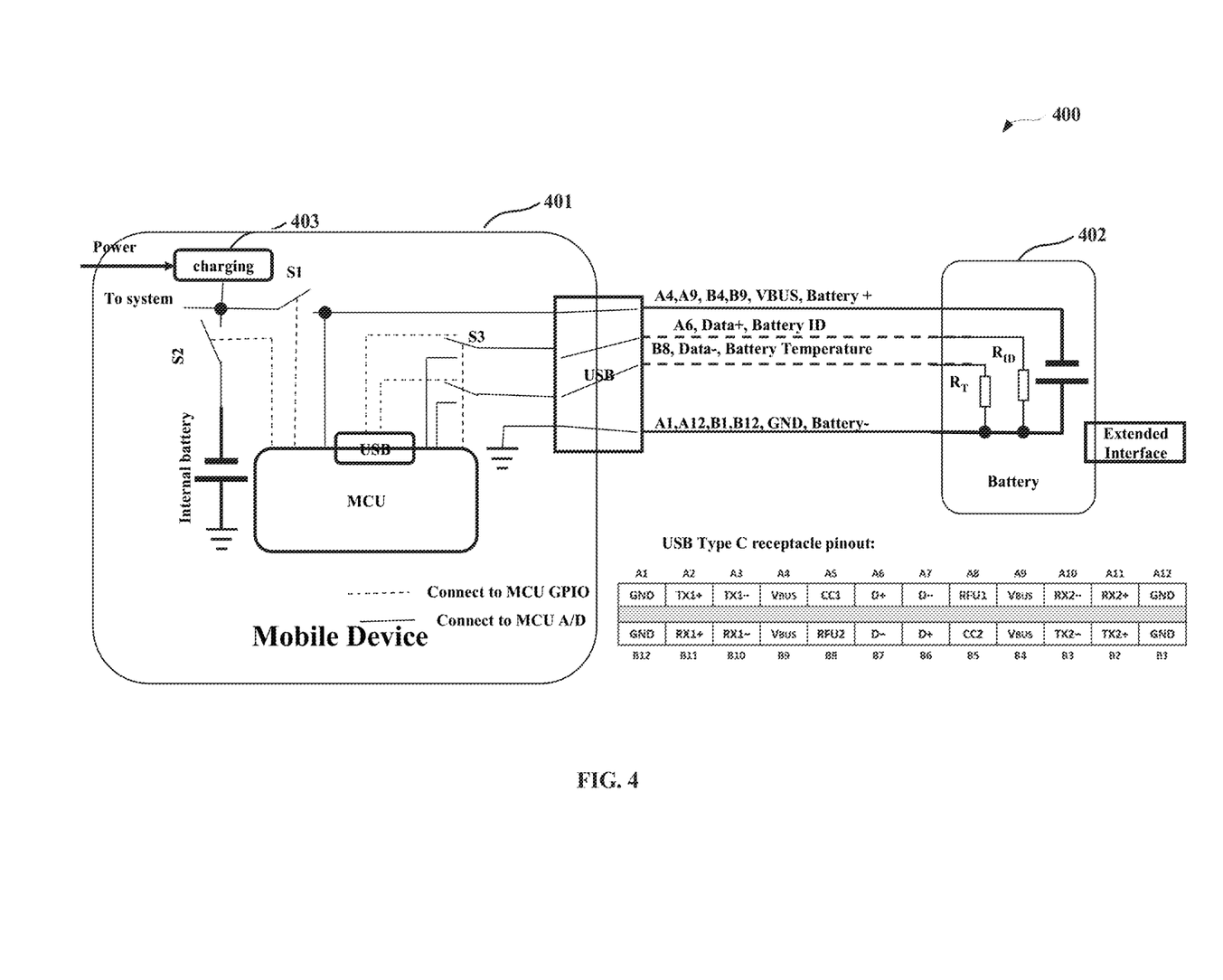
FIG. 4 is a schematic block diagram depicting the exemplary mobile device as illustrated in FIG. 3 being charged through a charging unit according to an embodiment of the present disclosure.

FIG. 4 is a schematic block diagram 400 depicting the mobile device 401, which is the same as the one illustrated in FIG. 3, being charged through a charging unit 403 according to an embodiment of the present disclosure.

In a default mode, the mobile device 401 may use the internal battery and therefore the switch "S1" is off, the switch "S2" is on and the switch "S3" would connect to the USB interface of the MCU as shown by dashed lines for potential data connections. This default mode could be kept unchanged when no external battery is connected or may be entered when the external battery is used for powering and a charger is connected with the mobile device 401 for charging.

When the charging operation is carried out on the mobile device 401, the charging unit 403 may manage to charge the internal battery first. When the internal battery is fully charged, the charging unit 403 may then control to charge the external battery 402. It should be understood that this charging operation may be performed wirelessly since the USB, which is supposed to connect to the charger, has been connected with the external battery 402.

Figure 5:
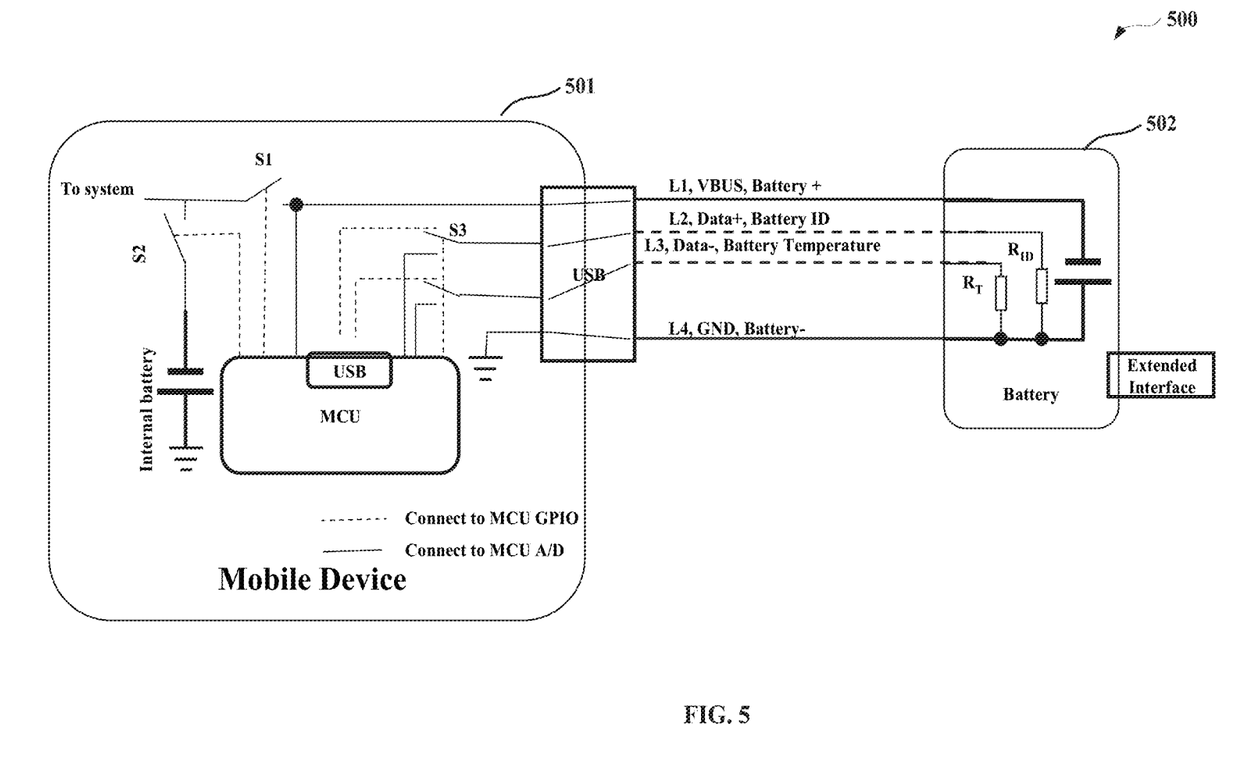
FIG. 5 is a schematic block diagram depicting an exemplary mobile device, which is powered by an external battery through a micro-USB according to an embodiment of the present disclosure.

FIG. 5 is a schematic block diagram 500 depicting a mobile device 501, which is powered by an external battery 502 through a micro-USB according to an embodiment of the present disclosure. The mobile device 501 and the external battery 502 are similar to the mobile device 401 and the external battery 402 respectively, except for the type of the USB interface, which is a micro type USB in the FIG. 5.

In particular, the positive battery terminal of the external battery 502 is connected with the voltage bus ("VBUS") via a predefined pin, e.g., L1 as shown, and the negative battery terminal of the external battery 502 is connected with the ground bus ("GND") via a predefined pin, e.g., L4 as shown. Further, the battery identity and temperature signals may be transmitted to the MCU A/D interface through predefined pins L2 and L3, respectively. Due to a high similarity except for the interface type, the operations performed by the mobile device 501 are substantively the same as the mobile device 401. Therefore, the detailed operations of the mobile device 501 are omitted herein for simplifying purposes.

Figure 6:
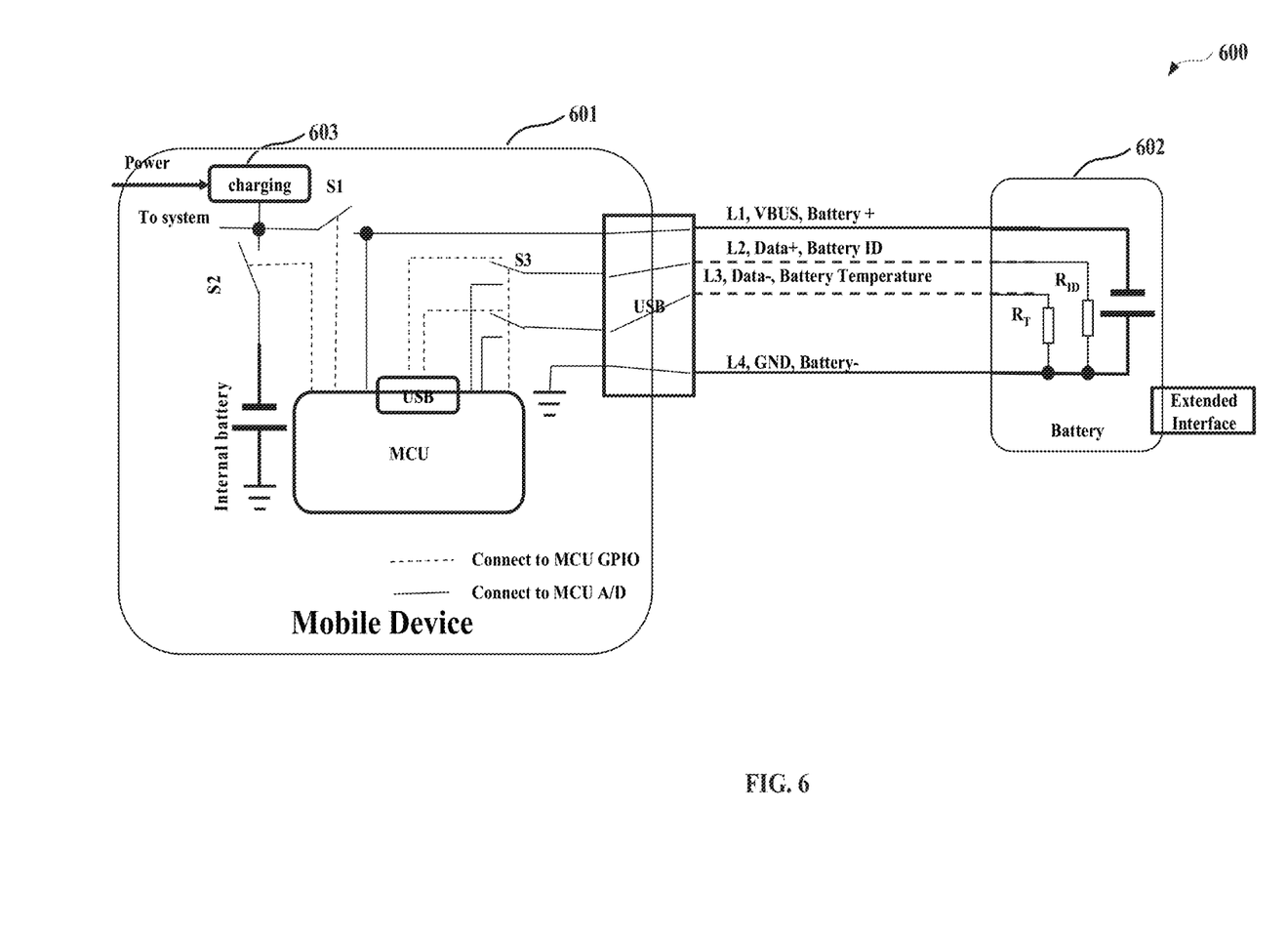
FIG. 6 is a schematic block diagram depicting the exemplary mobile device as illustrated in FIG. 5 being charged through a charging unit according to an embodiment of the present disclosure.

FIG. 6 is a schematic block diagram 600 depicting the mobile device 601, which is the same as the mobile device 501 illustrated in FIG. 5, being charged through a charging unit 603 according to an embodiment of the present disclosure. Since the operations performed by the mobile device 601 are the same as the mobile device 501, the description regarding how the mobile device 601 operates is omitted herein. Further, the operations of the charging unit 603 are similar to those of the charging unit 403. For example, the charging unit 603 controls to charge the internal battery first and then charge the external battery 602, if electrically connected, after the internal battery has been fully charged.

Figure 7:
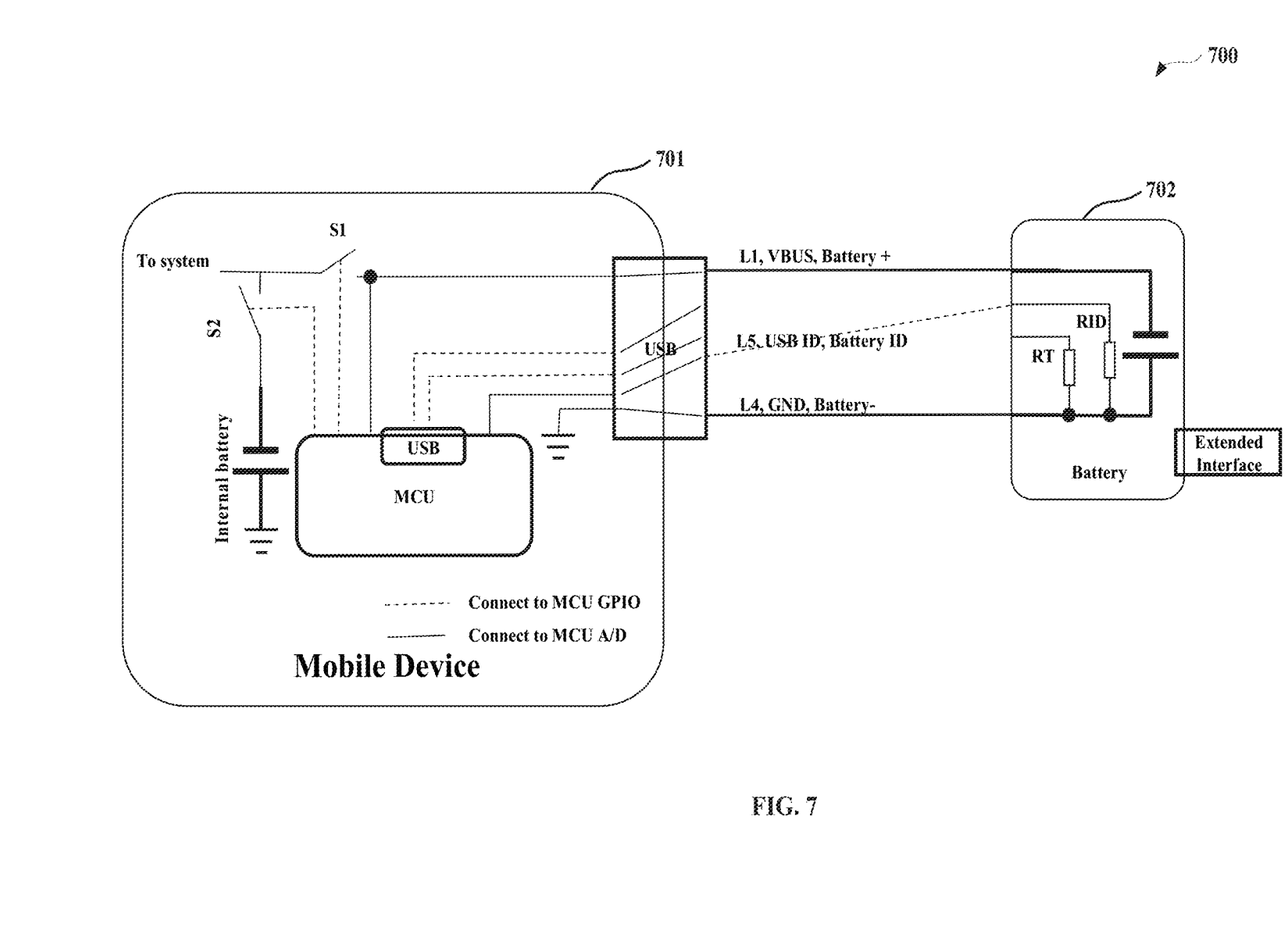
FIG. 7 is a schematic block diagram depicting an exemplary mobile device, which is powered by an external battery through a micro-USB according to another embodiment of the present disclosure.

FIG. 7 is a schematic block diagram 700 depicting a mobile device 701, which is powered by an external battery 702 through a micro-USB according to another embodiment of the present disclosure. The USB interface as illustrated is the micro type USB interface, which is the same type as the one shown in FIGS. 5 and 6 but a little different in terms of the connecting pins. In particular, instead of transmitting the temperature signal through the L3 and battery identity through the L2 as depicted in FIG. 6, the predefined pin L5 would be used for transmitting the signal regarding the battery identity. As to the battery temperature signal, as an option, is not transmitted and omitted in this solution.

Figure 8:
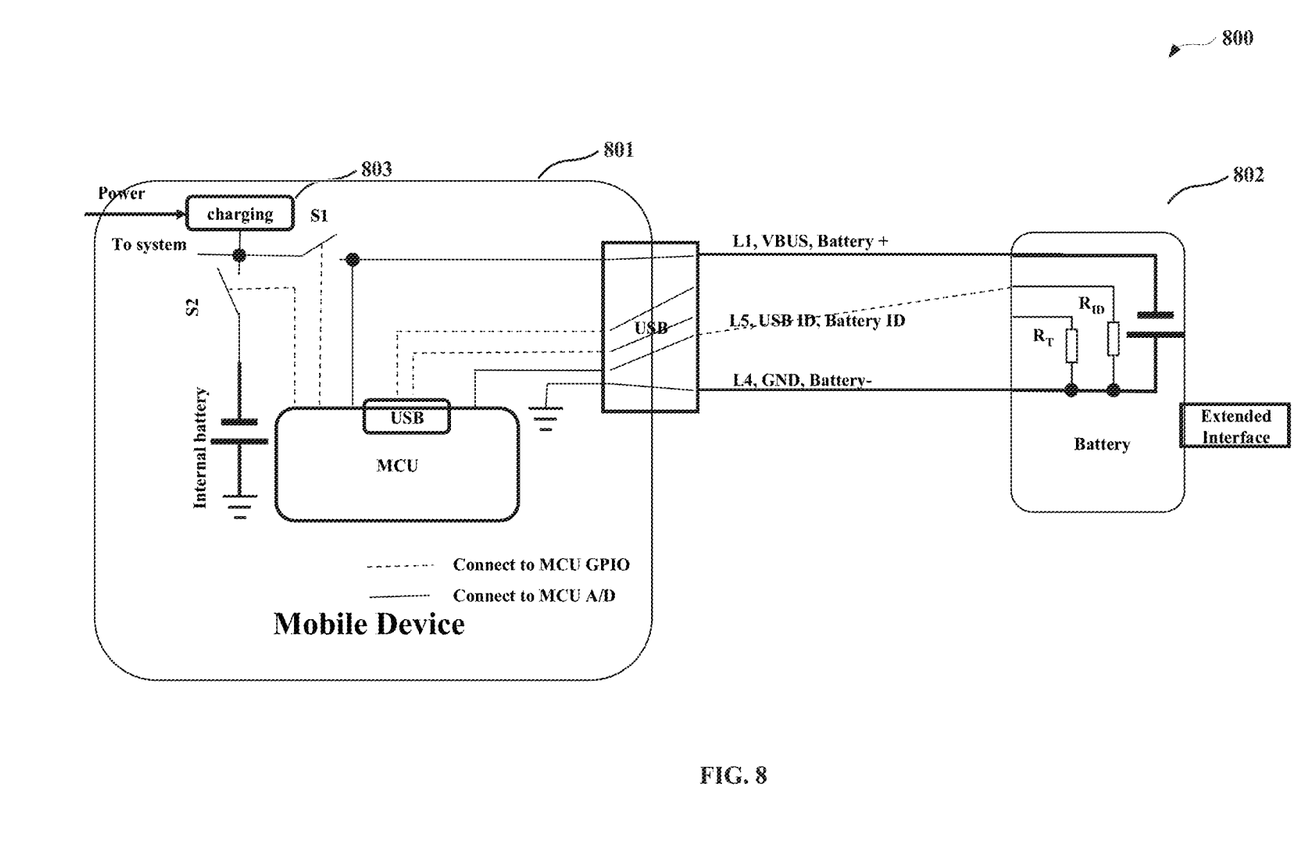
FIG. 8 is a schematic block diagram depicting the exemplary mobile device as illustrated in FIG. 7 being charged through a charging unit according to an embodiment of the present disclosure.

FIG. 8 is a schematic block diagram 800 depicting the mobile device 801, which is the same as the mobile device 701 illustrated in FIG. 7, being charged through a charging unit 803 according to an embodiment of the present disclosure. As discussed before with reference to FIGS. 4 and 6, based on the management of the charging unit 803, when the mobile device 801 is charged, the internal battery and external battery 802 would be sequentially charged, i.e., the internal battery first and the external battery 802 second.

Figure 9:
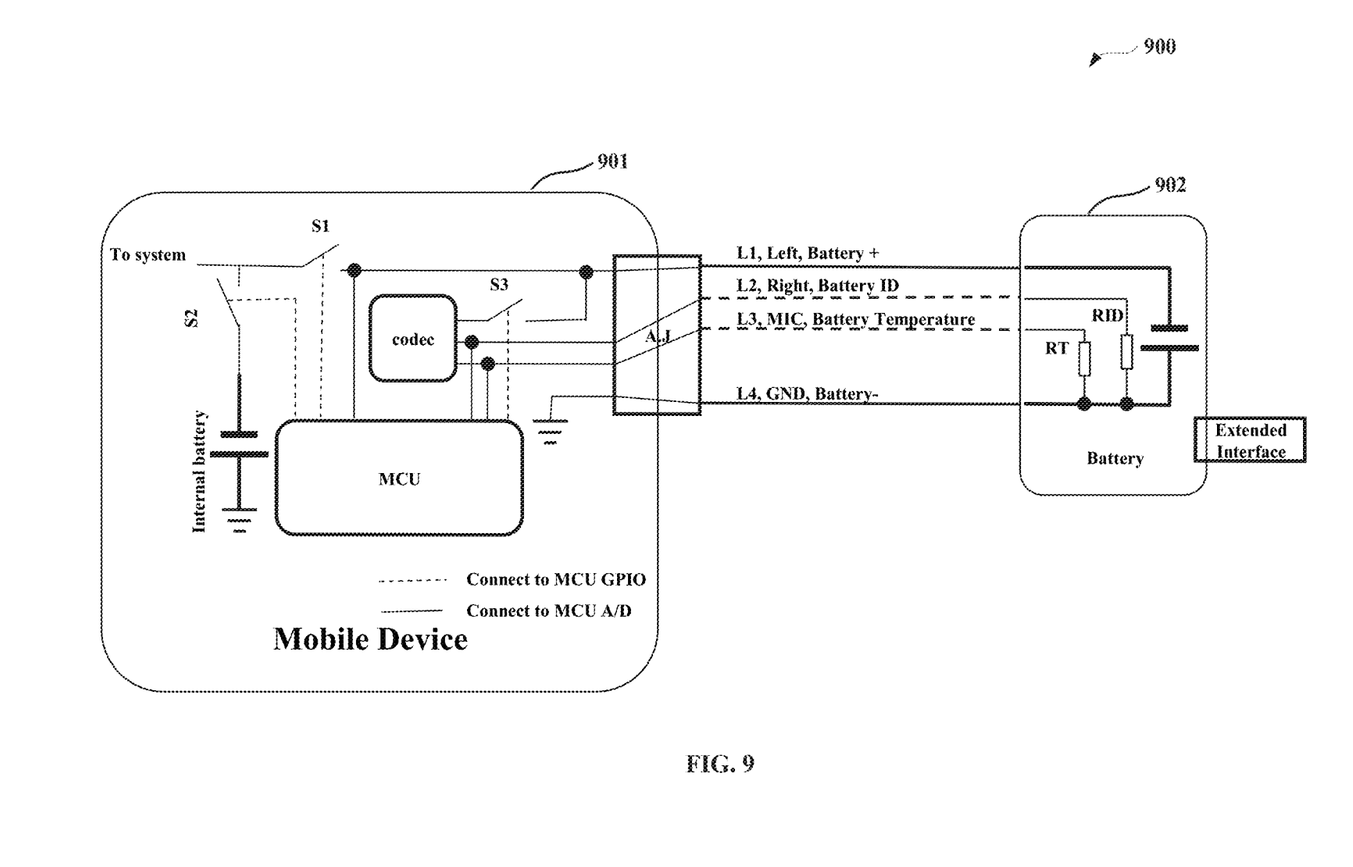
FIG. 9 is a schematic block diagram depicting an exemplary mobile device, which is powered by an external battery through an audio jack according to an embodiment of the present disclosure.

FIG. 9 is a schematic block diagram 900 depicting a mobile device 901, which is powered by an external battery 902 through an audio jack ("AJ" as illustrated) according to an embodiment of the present disclosure. It should be understood that the mobile device 901 may be the same as each of those discussed before except that the audio jack instead of the USB interface is applied for electrically connecting the external battery 902.

As illustrated in FIG. 9, the positive battery terminal of the external battery 902 may connect to the left channel of the audio jack through the path "L1" and the negative battery terminal of the external battery 902 may connect to the ground of the audio jack through the path "L4." Further, the path "L2" could be established between the right channel of the audio jack and the external battery 902 for transmitting the battery identity signal to the MCU A/D interface and likewise the path "L3" could be established between the microphone port and the external battery 902 for transmitting the battery temperature signal to the MCU A/D interface. To protect the codec from being adversely affected by the voltage from the external battery 902, a switch "S3," which is under control of the MCU GPIO, may be set between the codec and the left channel and could be switched off after detecting that the external battery has been electrically connected with the mobile device 901. The switch "S3" may be switched on when a handset rather than the external battery 902 is inserted into the audio jack.

Since the MCU in the mobile device 901 may operate in the same manner as previously-discussed MCUs do, its detailed operations are omitted herein for a simplifying purpose.

Figure 10:
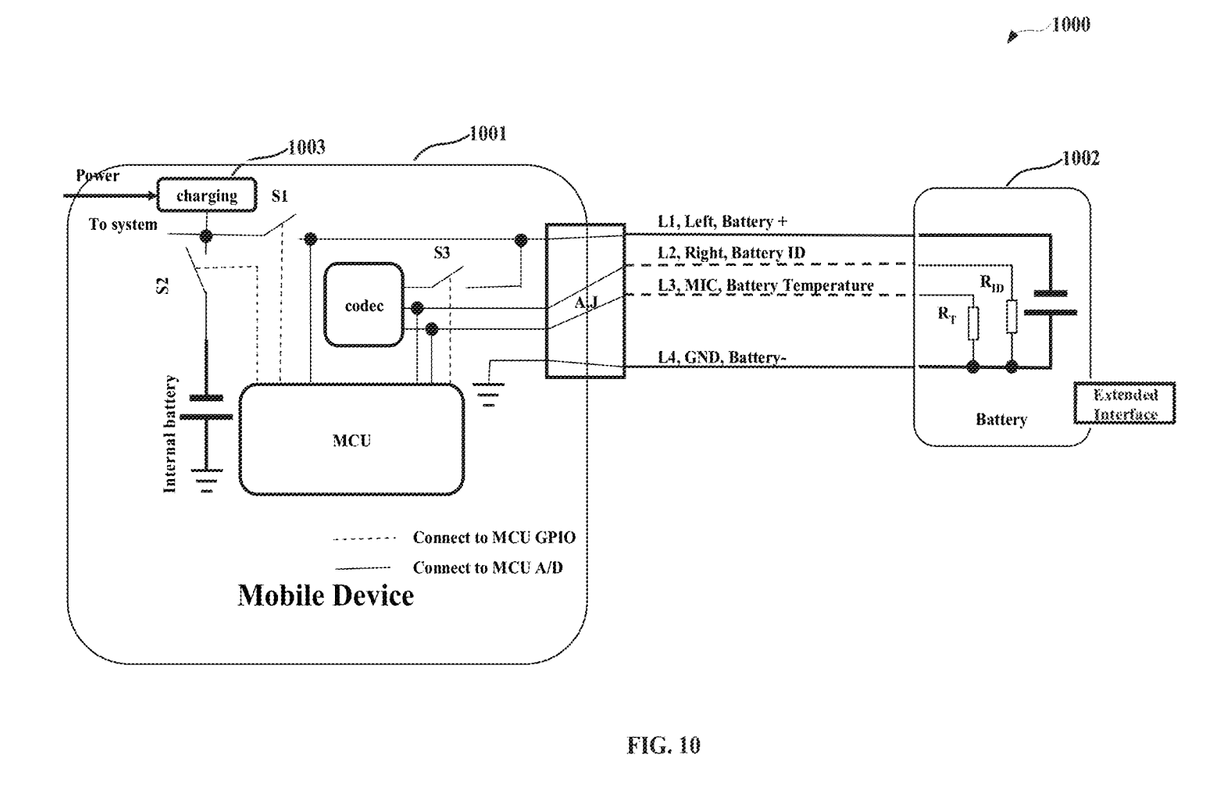
FIG. 10 is a schematic block diagram depicting the exemplary mobile device as illustrated in FIG. 9 being charged through a charging unit according to an embodiment of the present disclosure.

FIG. 10 is a schematic block diagram 1000 depicting the mobile device 1001, which is the same as the mobile device 901 as illustrated in FIG. 9, being charged through a charging unit 1003 according to an embodiment of the present disclosure. As illustrated in FIG. 10 and discussed before, the charging unit 1003 may manage the charging operations such the internal battery is changed first and after that, the external battery 1002 could be charged.

FIG. 11 is a schematic block diagram 1100 depicting a mobile device 1101 being powered by a plurality of external batteries 1102 which are cascaded with one another through respective extended interfaces (not shown for simplicity). From the schematic connection as illustrated, it is to be understood that the solutions as proposed by the present disclosure may provide higher battery capacity such that applications with high energy-consumption could be run for a relatively long time as compared with the existing technique.

Figure 12:
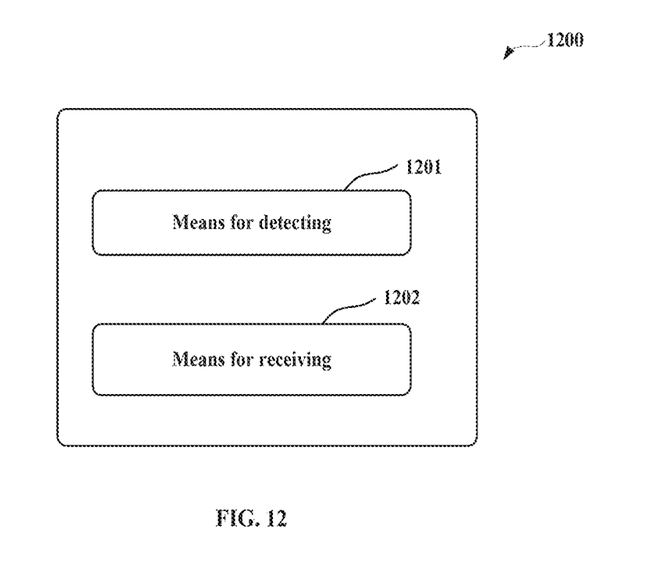
FIG. 12 is a schematic block diagram depicting an exemplary apparatus, which is powered by an external battery, according to another embodiment of the present disclosure.

FIG. 12 is a schematic block diagram depicting an apparatus 1200, which is powered by an external battery (not shown), according to another embodiment of the present disclosure. As illustrated in FIG. 12, the apparatus 1200 includes means 1201 for detecting whether an external battery is useable for powering a mobile device through an interface. The apparatus 1200 also comprises means 1202 for receiving power through the interface upon detecting the external battery being useable for powering the mobile device through the interface. It is to be understood that the apparatus 1200 is able to perform the steps of the method 100 as discussed before with reference to FIG. 1. Further, the apparatus 1200 may be embodied as a mobile device or a part thereof.

The techniques described herein may be implemented by various means so that an device implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation may be through modules (e.g., procedures, functions, and so on) that perform the functions described herein.

Many modifications and other embodiments of the disclosure set forth herein will come to mind to one skilled in the art to which these embodiments of the disclosure pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
   detecting whether an external battery has been connected with a mobile device through a universal serial bus type C interface and a voltage provided by the external battery is within a predefined voltage scope;
   detecting, through a data terminal of the universal serial bus type C interface, at least one of an identity of the external battery and a temperature of the external battery;
   detecting, based on the at least one of the identity of the external battery and the temperature of the external battery, whether the external battery is useable for powering the mobile device through the universal serial bus type C interface, wherein a voltage bus of the universal serial bus type C interface is configured to be coupled to a positive terminal of the external battery; and
   in response to detecting the external battery being useable for powering the mobile device through the universal serial bus type C interface, allowing to receive power through the voltage bus of the universal serial bus type C interface in a case where no current is detected at configuration channel pins of the universal serial bus type C interface.

2. The method of claim 1, further comprising:
   in response to detecting the external battery being useable for powering the mobile device through the universal serial bus type C interface, disabling power supply from an internal battery of the mobile device.

3. The method according to claim 1, further comprising:
   connecting a negative battery terminal of the external battery to a ground of the universal serial bus type C interface.

4. The method according to claim 1, further comprising performing charging operations on the mobile device, wherein the charging operations comprise:
   charging an internal battery of the mobile device; and
   after the charging of the internal battery of the mobile device has been completed, charging the external battery.

5. The method according to claim 1, wherein the external battery is cascaded with one or more other external batteries through an extended interface.

6. An apparatus, comprising:
   a universal serial bus type C interface configured to connect the apparatus with an external battery, wherein a voltage bus of the universal serial bus type C interface is configured to be coupled to a positive terminal of the external battery;
   a detector configured to:
      detect whether the external battery has been connected with the apparatus through the universal serial bus type C interface and a voltage provided by the external battery is within a predefined voltage scope,
      detect, through a data terminal of the universal serial bus type C interface, at least one of an identity of the external battery and a temperature of the external battery, and
      detect, based on the at least one of the identity of the external battery and the temperature of the external battery, whether the external battery is useable for powering the apparatus through the universal serial bus type C interface; and
   a receiver configured to, in response to detecting the external battery being useable for powering the apparatus through the universal serial bus type C interface, allow to receive power through the voltage bus of the universal serial bus type C interface in a case where no current is detected at configuration channel pins of the universal serial bus type C interface.

7. The apparatus of claim 6, wherein the receiver is further configured to:
in response to detecting the external battery being usable for powering the apparatus through the universal serial bus type C interface, disable power supply from an internal battery of the apparatus.

8. The apparatus according to claim 6, wherein a ground of the universal serial bus type C interface is configured to be connected to a negative battery terminal of the external battery.

9. The apparatus according to claim 6, further comprising:
a charger configured to perform charging operations on the apparatus, wherein the charging operations comprise:
charging an internal battery of the apparatus, and
after the charging of the internal battery of the apparatus has been completed, charging the external battery.

10. The apparatus according to claim 6, wherein the external battery comprises a battery interface for powering the apparatus.

11. The apparatus according to claim 6, wherein the external battery is cascaded with one or more other external batteries through an extended interface.

* * * * *